United States Patent [19]

Awakowicz et al.

[11] Patent Number: 4,771,453
[45] Date of Patent: Sep. 13, 1988

[54] TELEPHONE SUBSCRIBER STATION COMPRISING AN ACTUATING DEVICE WHICH ACTUATES A CRADLE SWITCH

[75] Inventors: Erwin Awakowicz, Munich; Peter Kleine, Fischen, both of Fed. Rep. of Germany

[73] Assignee: Siemens Aktiengesellschaft, Berlin and Munich, Fed. Rep. of Germany

[21] Appl. No.: 66,214

[22] Filed: Jun. 25, 1987

[30] Foreign Application Priority Data

Jul. 30, 1986 [DE] Fed. Rep. of Germany ... 8620423[U]

[51] Int. Cl.⁴ .............................................. H04M 1/08
[52] U.S. Cl. .................................... 379/424; 200/330; 200/339

[58] Field of Search ....................... 379/424, 422, 427; 200/155 R, 330, 335, 336, 339

[56] References Cited

U.S. PATENT DOCUMENTS 4,658,421 4/1987 Bohannon ........................ 379/424 X Primary Examiner—James L. Dwyer
Attorney, Agent, or Firm—Hill, Van Santen, Steadman & Simpson

[57] ABSTRACT

An actuating member for a cradle switch comprises free ends with oblong holes for receiving male members mounted within the housing of a telephone set to define a pivot axis. A web having a recess therein is mounted within the telephone station and a detent carried by the actuating device projects into the recess.

2 Claims, 1 Drawing Sheet

TELEPHONE SUBSCRIBER STATION COMPRISING AN ACTUATING DEVICE WHICH ACTUATES A CRADLE SWITCH

BACKGROUND OF THE INVENTION

1. Field of the Invention

The present invention relates to a telephone subscriber station comprising an actuating device for actuating a cradle switch, the actuating device comprising oblong holes at a region of the free ends into which male members arranged within the telephone subscriber station engage.

2. Description of the Prior Art

Usually, the actuating members that act on the cradle switch of a telephone subscriber station are arranged in the upper housing portion of the telephone station. Therefore, it is known to provide intermediate members seated in the upper housing portion of the actuation of the cradle switch, the intermediate members being externally accessible and being movable on a straight line in a guide between two final positions. For absorbing the actuating force, first of all, and, secondly, for transmitting the actuating force, these mechanical intermediate elements comprise two regions that are spatially separated from one another, whereby motional axes of these two regions that are directed parallel to one another are laterally offset to one another. It is also known to provide male members in the lateral region of a chassis seated in the telephone station, the actuating members being constructed as arms and comprising a free end and ends provided with oblong holes being capable of being hooked into the male members. The actuating members are additionally guided by webs arranged thereat which engage into slot-shaped recesses at the chassis.

SUMMARY OF THE INVENTION

The object of the present invention is to provide a different type of guidance and mounting for the actuating device.

The above object is achieved, according to the present invention, in that at least one web arranged at the telephone subscriber station is provided with a recess in the region of the bearing location, and a detent is provided at the actuating device to project into this recess.

These recesses in the webs can thereby be dimensioned such that they correspond to the lifting path required for the actuation of the cradle switch. Also achieved on the basis of the webs is that the actuating device is also held in a desired position when no assemblies have as yet been mounted within the station.

In order to keep friction at the bearing location as low as possible, the male members are constructed with conically tapered free ends in accordance with another feature of the invention.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
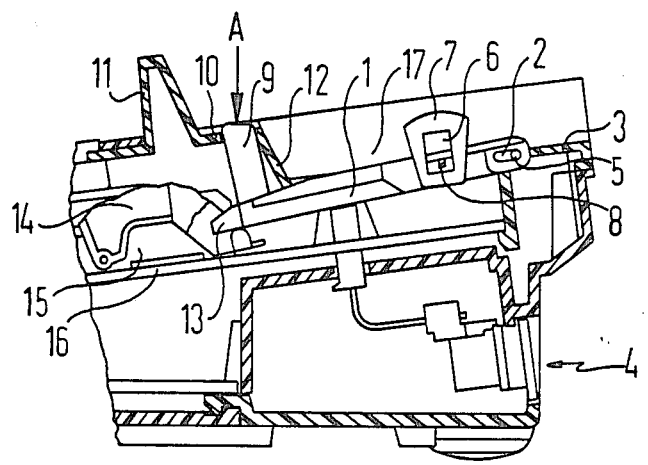
FIG. 1 is a fragmentary sectional view illustrating the bearing of the actuating device actuating the cradle switch in a telephone subscriber station when the handset (not shown) is hung up.

At one of its free ends, an actuating device 1 comprises receptacles 2 designed as oblong holes which receive male members 5 arranged at the housing 3 of the telephone subscriber station 4. In order to keep the friction between the receptacles 2 and the actuating device 1 as low as possible, the male members 5 have their free ends formed with a conical taper.

Also provided at the housing 3 in the region of the oblong holes 2 which allow a displacement in the longitudinal direction is a web 7 comprising a recess 6, a detent 8 arranged at the actuating device projecting into the recess 6. What is achieved with the detent structure is that the actuating device 1 is held in a desired position when assemblies have not yet been mounted inside the telephone subscriber station 4. The respective other, free end of the actuating device comprises, first of all, an actuation element 9 which extends through a clearance 10 in the deposit trough 17 for the handset in the upper housing portion 11 of the telephone subscriber station. The actuation element 9 of the actuating device 1 is additionally guided at walls 12 of the upper housing portion.

Figure 2:
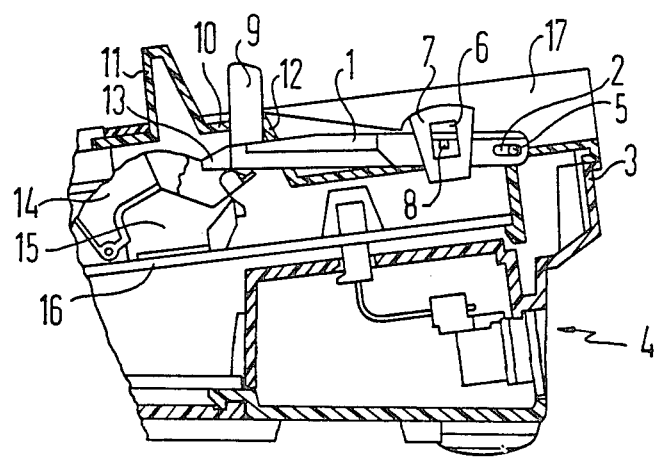
FIG. 2 illustrates the arrangement of FIG. 1 when the handset (not shown) is lifted.

A projection 13 acts on a switch rocker 14 of the cradle switch 15 arranged on a printed circuitboard 16 in the region of the actuation element 9. As illustrated in FIG. 1, the cradle switch is actuated opposite the spring power by a hung-up handset. This condition is indicated by the arrow A. When the handset is lifted, the actuation element 9 of the actuating device 1 is actuated by spring power via the rocker and therefore proceeds into the condition illustrated in FIG. 2.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of my contribution to the art.

We claim:

1. In a telephone subscriber station of the type in which an actuating device is operated by a handset to actuate a cradle switch within the housing of the telephone station, the improvement wherein said actuating device comprises:
    an elongate body including first and second ends, said first end mounted adjacent and engaging the cradle switch and including a member projecting therefrom for engaging the handset, said second end comprising oblong recesses;
    male members projecting from the telephone housing and engaging in said oblong recesses to form a pivot for said actuating device;
    a web connected to the housing and including a recess; and a detent carried by said elongate member and engaging in the recess in said web.

2. The improved telephone subscriber station of claim 1, wherein:
    each of said male members comprises conically tapered free ends in said oblong recesses for decreasing friction.

* * * * *